United States Patent [19]

Laxo

[11] 4,335,987
[45] Jun. 22, 1982

[54] APPARATUS FOR VERTICALLY STACKING FLAT WEIGHTS

[75] Inventor: Darryl E. Laxo, Novato, Calif.

[73] Assignee: The United States of America as represented by the Secretary of the Navy, Washington, D.C.

[21] Appl. No.: 144,707

[22] Filed: Apr. 28, 1980

[51] Int. Cl.³ .................. B65G 57/30; B65G 59/06
[52] U.S. Cl. ............................. 414/27; 114/331;
271/18; 271/212; 414/93; 414/126; 414/129
[58] Field of Search ............... 414/27, 92, 93, 95,
414/96, 81, 125, 126, 127, 129, 673, 719;
212/195; 280/759; 114/331; 221/251, 297;
271/18, 23, 109, 212

[56] References Cited

U.S. PATENT DOCUMENTS

| 1,235,506 | 7/1917 | Strauss | 212/195 |
|---|---|---|---|
| 2,820,556 | 1/1958 | Davis | 280/759 X |
| 2,954,133 | 9/1960 | Geisow | 414/93 |
| 3,273,751 | 9/1966 | DeWees | 414/126 X |
| 3,568,860 | 3/1971 | Rawlins | 414/93 |
| 3,683,835 | 8/1972 | Deslierres | 14/331 |
| 3,837,504 | 9/1974 | Focke et al. | 414/93 |
| 4,197,806 | 4/1980 | Laxo | 414/27 X |

FOREIGN PATENT DOCUMENTS 1139071 10/1962 Fed. Rep. of Germany ...... 414/126

*Primary Examiner*—Leslie J. Paperner
*Attorney, Agent, or Firm*—R. F. Beers; Charles D. B. Curry; George L. Craig

[57] ABSTRACT

A system for loading/unloading a series of vertically stacked weights, each weight being substantially flat and having a central aperture. Two parallel aligned spatially separated c-tubes receive a weight and are caused to rotate via a right angle drive system. The weight held by the rotating c-tubes is then lifted vertically and received by a holding mechanism aligned with the central aperture of the weight.

1 Claim, 6 Drawing Figures

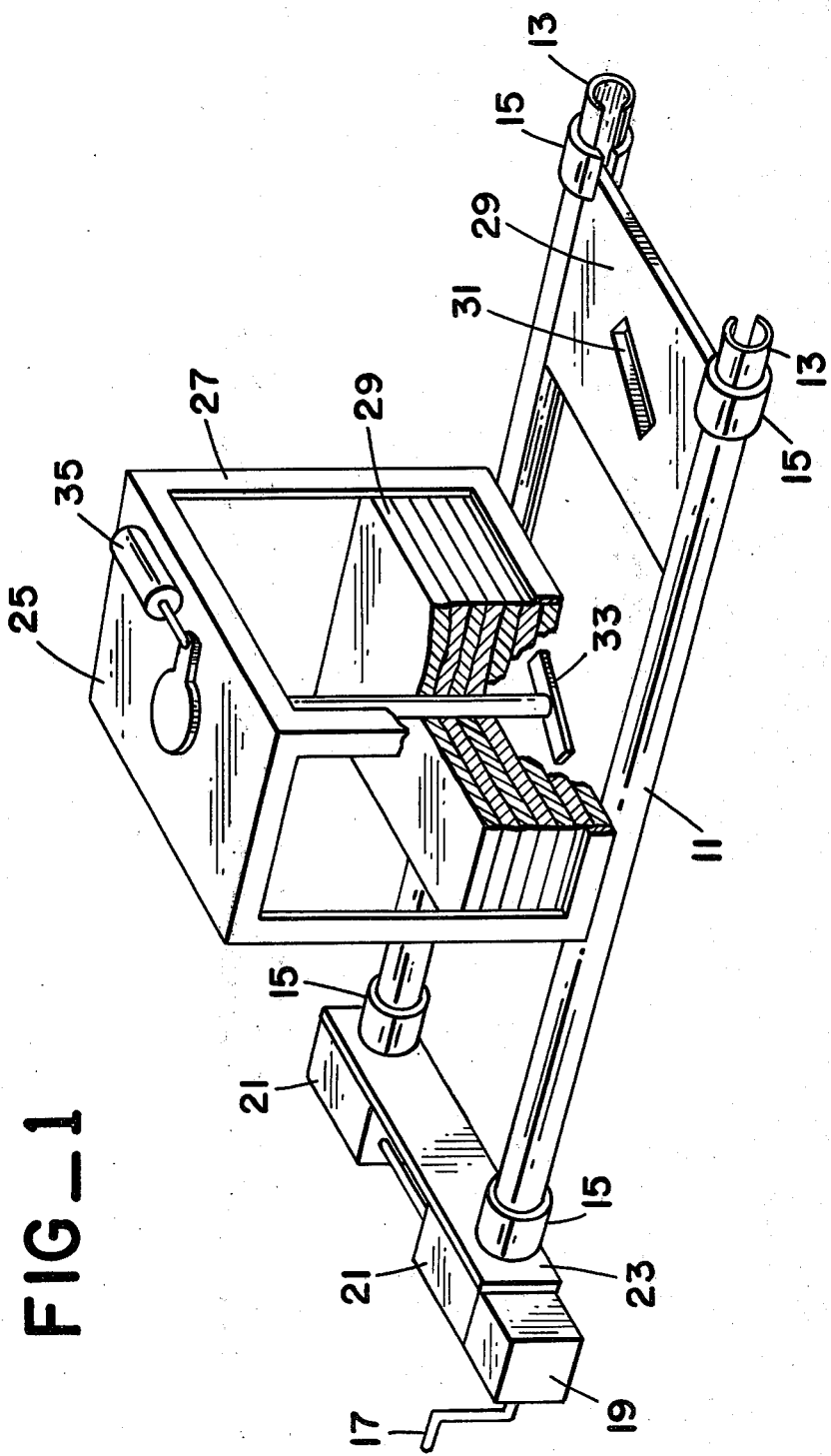

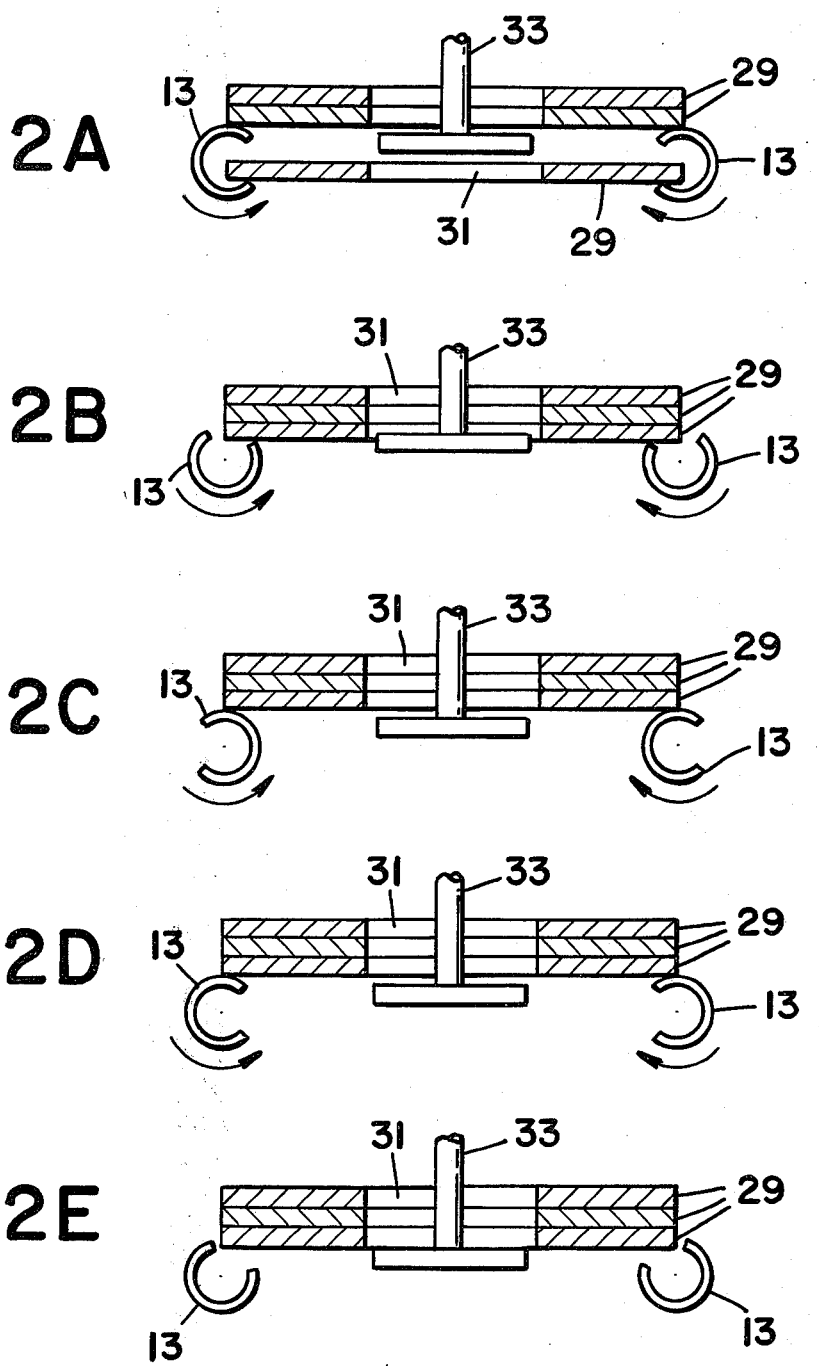
FIG_2A-E

APPARATUS FOR VERTICALLY STACKING FLAT WEIGHTS

BACKGROUND OF THE INVENTION

1. Field of the Invention

This invention relates to a weight loading apparatus. Specifically, the invention relates to an apparatus for vertically loading and stacking a series of flat weights having a predetermined central aperture.

2. Description of Prior Art

Deep submersible vehicles (DSV's), both civilian and military, routinely carry releasable ballast to control vehicle stability and to permit predetermined diving profiles of the vehicles. The ballast is generally contained within some weight release apparatus in the form of discrete weights and the weight release apparatus is usually configured to permit release of all or a preselected number of weights upon demand. The weight release sequence is unique in that the weights must be unloaded or released in inverse order to that in which they were loaded. Conventional stacking mechanisms either are configured to work with comparatively very light, thin materials, i.e., paper sheets, or the loading assembly is immoveably attached to whatever assembly retains the stacked items. The particular problem with DSV's was that the old weight loading method required an individual to hand load the weights into the weight release apparatus. This required the individual to load the weights while beneath the weight release mechanism. Such a procedure was not only inherently dangerous, but also limited the number of weights loaded to the strength of the individual. Furthermore, to load the weight release mechanism which was attached to the DSV required that the DSV be placed on high blocks during loading. The instant invention eliminates the unsafe, inefficient and time wasteful procedures by providing a unique apparatus for vertically loading/unloading a series of flat weights.

SUMMARY OF THE INVENTION

Briefly summarized is a system for loading/unloading a series of vertically stacked weights into a weight holding mechanism, U.S. Pat. No. 4,197,806, filed July 14, 1978, each weight being substantially flat and having a central aperture. Two parallel aligned spatially separated c-tubes receive a weight and are caused to rotate via a right-angle drive mechanism. The weight held by the rotating c-tubes is then lifted vertically and received by a holding mechanism aligned with the central aperture of the weight.

A primary object of invention is to provide an apparatus for loading/unloading and releasably holding a vertically stacked series of flat weights. A secondary object of invention is to provide a two-part weight loading/unloading apparatus in which the weight loader assembly may be used to load a number of weight release mechanisms with vertically stacked series of flat weights.

BRIEF DESCRIPTION OF THE DRAWINGS

FIG. 1 is a perspective view of the instant invention.
FIGS. 2A-E is a cross-section view of a portion of the loading assembly illustrating the loading operation.

DESCRIPTION OF THE PREFERRED EMBODIMENT

Referring to FIG. 1, the weight loader assembly 11 is shown having a pair of spatially separated parallel aligned counter rotating c-tubes 13 supported by four tubular bearings 15 attached to the frame of the DSV. Neither the DSV nor the method of mounting the bearings 15 to the DSV are shown. Such mounting is, however, straightforward, e.g., attachment by support plates to the frame of the DSV. A manual or powered crank 17 is connected to a right angle gear reducer 19 which is in turn connected to one of the two interconnected right angle drives 21. The right angle drives are mounted on a detachable mounting bracket 23 such that when the c-tubes 13 are inserted into four DSV mounted bearings 15, the mounting bracket 23 can be attached to one pair of bearings 15 and the DSV frame. Located approximately half-way along the longitudinal axis of the c-tubes 13 and between them is the weight holding/releasing mechanism 25. The weight holding-/releasing mechanism 25 is permanently attached to the DSV frame, not shown, and is comprised of a cagelike framework 27 open at the end adjacent the c-tubes 13 to receive/release weights 29 having central apertures 31 and closed at the end adjacent the DSV frame. A rotatable T-bar 33 is attached to the closed end of the cagelike framework 27 and can be selectively activated by an actuator 35 also attached to the closed end of the cagelike framework 27.

Referring to FIG. 1 and FIG. 2A-E, the loading process of the instant invention may be easily seen. The c-tubes 13 of the loader assembly 11 are slipped into the four tubular bearings 15 and beneath the weight holding/releasing mechanism 25 such that the T-bar 33 is positioned as shown. The loading assembly 11 is then attached firmly to the DSV frame via the mounting bracket 23. A weight 29 to be loaded is then inserted in the c-tubes 13 at the open end opposite the drive mechanism 21 as shown and moved into position beneath the cagelike framework 27 such that the central aperture 31 of the weight 29 is aligned with the T-bar 33 as shown in FIG. 2A. Alignment can be aided by inserting stops in the c-tubes. The crank 17 is then rotated such that the c-tubes 13 lift the weight 29 until it has moved above the tee of the T-bar 33 as shown in FIGS. 2B-2D. The process is repeated until all weights are loaded or until that quantity of weights having the same aperture orientation are loaded. The T-bar 33 is then rotated to a new position via the actuator 35 to hold all weights loaded to that point, FIG. 2E. More weights having different aperture orientations may be loaded as desired. The mounting bracket 23 is then detached from the DSV frame and the loading assembly 11 removed. Unloading of the weights 29 occurs in a similar but opposite sequence. During operation of the DSV, the weights so loaded may be released from the cagelike framework 27 at any desired interval by actuation of the T-bar actuator 35 by controls, not shown, within the DSV. The actuator may mechanical, electromechanical or hydraulic as design requires.

What is claimed is:

1. An apparatus for vertically stacking and unstacking a predetermined group in a series of groups of flat weights while said series of remaining groups are fixedly held comprising:
   (a) a powered crank for raising or lowering each of said weights in said group for stacking or unstacking, the rotation direction of said crank determining whether stacking or unstacking is accomplished;

(b) a gear reducer operably connected to said crank;

(c) a pair of right-angle drives attached to a mounting bracket and operably connected to said gear reducer;

(d) a pair of spatially separated parallel-aligned c-tubes, each of said c-tubes connected by a shaft coupling to one of said right-angle drives; and (e) means for retaining in vertical array said grouped series of said weights, said retaining means positioned adjacent said lifting means to operably receive said weights vertically lifted into the open bottom of said retaining means, said retaining means having a central post for retaining said series of groups of said flat weights in predetermined series order.

* * * * *